United States Patent [19]

Olschewski et al.

[11] 4,209,208
[45] Jun. 24, 1980

[54] ROLLING BEARING FOR CONVEYOR ROLLS

[75] Inventors: Armin Olschewski, Schweinfurt; Manfred Brandenstein, Aschfeld; Lothar Walter, Schweinfurt; Rainer Schurger, Schwanfeld; Gunter Neder, Schweinfurt, all of Fed. Rep. of Germany

[73] Assignee: SKF Industries, Inc., King of Prussia, Pa.

[21] Appl. No.: 949,512

[22] Filed: Oct. 10, 1978

[30] Foreign Application Priority Data

Oct. 13, 1977 [DE] Fed. Rep. of Germany ... 7731602[U]

[51] Int. Cl.² ............... F16C 13/02; F16C 33/76; F16C 35/06
[52] U.S. Cl. ............................. 308/20; 308/187
[58] Field of Search ............... 29/116 R; 193/35 R, 193/37; 198/780; 308/20, 187.2, 193, 194, 189 R, 189 A, 233, 187.1, 187

[56] References Cited

U.S. PATENT DOCUMENTS

| | | | |
|---|---|---|---|
| 1,793,346 | 2/1971 | Wega | 308/20 |
| 3,345,115 | 10/1967 | Olender et al. | 308/20 |
| 4,027,932 | 6/1977 | Kunkel et al. | 308/233 |

*Primary Examiner*—Frederick R. Schmidt
*Attorney, Agent, or Firm*—Eugene E. Renz, Jr.

[57] ABSTRACT

Ball bearing assembly for rotatably supporting a belt support roll on an axle comprising a pair of bearing rings having confronting spaced apart sections defining inner and outer raceways disposed at an angle to the normal axis for a plurality of balls. The inner bearing ring has a radial outwardly directed flange serving as means to secure the bearing to the roll casing and a flange extending radially inwardly from the race confronting a sleeve mounted on the axle. The outer bearing ring has an annular ring flange facing inwardly to the bearing axle confronting the radial flange of the inner bearing ring and terminating in an annular shoulder running axially for fastening to the axle. A sleeve circumscribes the axle and has a radially outwardly directed rib which forms with the inner bearing ring an annular chamber for a sealing agent. A seal with flocked fibers is interposed between the confronting inner flanges of the inner and outer bearing rings.

6 Claims, 1 Drawing Figure

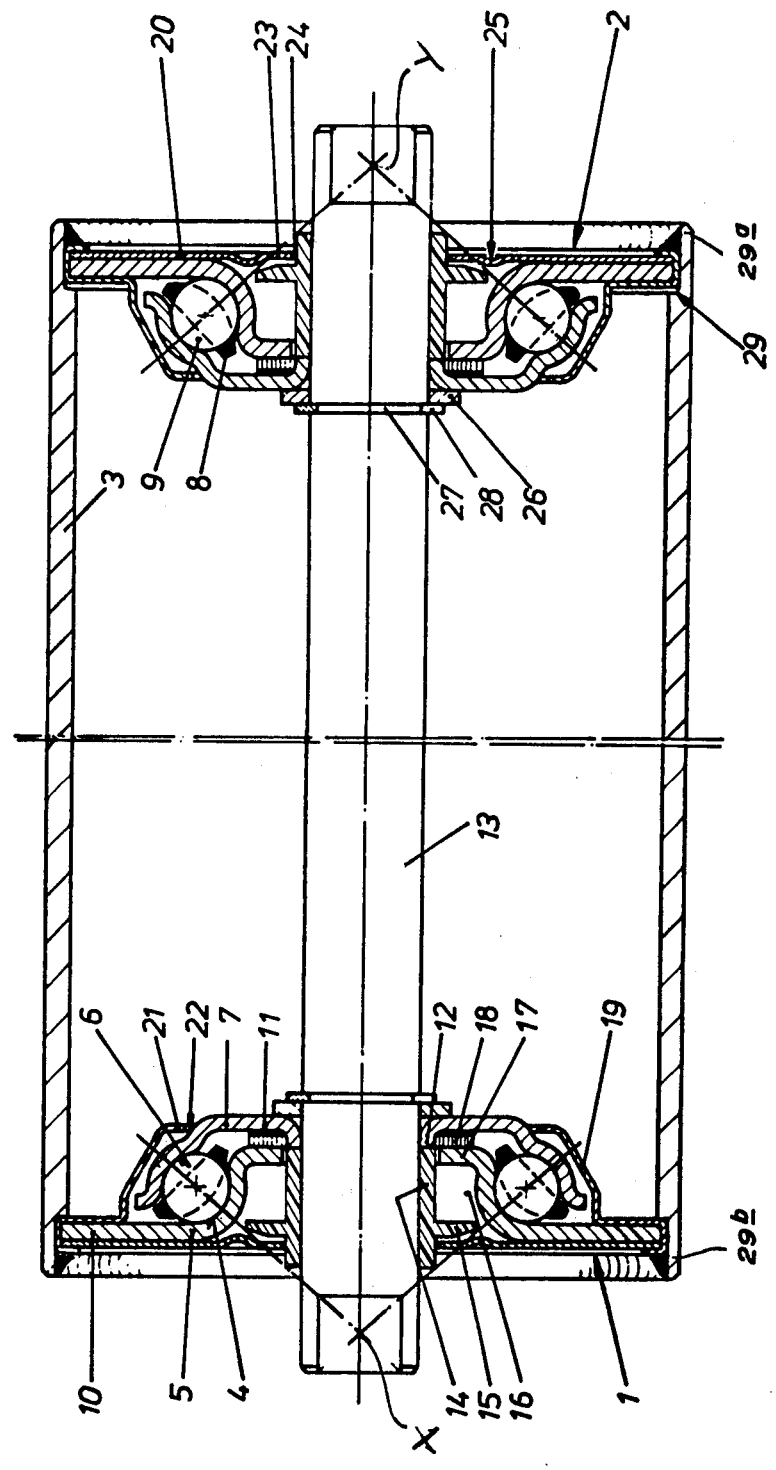

ROLLING BEARING FOR CONVEYOR ROLLS

BACKGROUND OF THE INVENTION

The present invention relates to ball bearings and more specifically to a ball bearing assembly for belt support rolls with sheet metal bearing rings which are provided in conjunction with the sections which carry the race rings for the bearings with inwardly and outwardly directed ring flanges.

Bearing rings made of sheet metal, for example, for conveyor belt rolls for light goods are previously known. A known design of this type is shown in German DT-"Gbm" No. 7,334,209. In this assembly the outer ring made of sheet metal is pushed out of the bearing top as an integral part of the closing cap and the inside ring which is made as a deep drawn part is designed in one piece with a dust cover formed as a ring flange. The ring flanges which span both bearing rings on the components which carry the races are directed outwardly or inwardly to the same side of the bearing.

This known construction has certain disadvantages and drawbacks. For example, it has been found that the construction and arrangement precludes filling the bearing with the optimal number of rolling elements and accordingly the load carrying capacity is small. Further, the construction does not lend itself to pre-tensioning of the bearing so that it is free from play in an axial direction. Additionally the seal does not provide optimum sealing characteristics in preventing loss of lubrcating agent from the bearing or preventing ingress or penetration of foreign matter from outside into the bearing. Accordingly, in applications such as underground mining, dust particles, penetrate the bearing resulting in premature failure and a foreshortened useful life. In some instances separate seals are used and this produced an even wider design that also has the effect of unfavorably changing the support width between the pairs of bearings and the points of load distribution. Lastly the bearing rings of these known bearing designs are of a rather complex and difficult to manufacture shape which increases the cost of production and the cost of the finished product.

With the foregoing in mind, it is an object of the present invention to provide a ball bearing assembly especially adapted for belt support rolls with sheet metal bearing rings which is of a comparatively simplified configuration and therefore easy and economical to manufacture and which is characterized by novel features of construction and arrangement providing an optimal load carrying capacity with high rigidity and effective sealing against escape of lubricant and ingress of foreign particulate matter.

SUMMARY OF THE INVENTION

In accordance with the present invention, a bearing assembly is provided which comprises a first bearing ring having a section defining the inner race arranged at an angle to the normal axis and having an annular ring flange directed outwardly which is adapted to be connected to the roll or casing and a second bearing ring having a section defining the outer race also disposed at an angle to the normal axis and having an annular flange facing inwardly to the bearing axle on the side of the ball bearing opposite the annular ring flange of the first bearing ring. The second bearing ring having a section defining the outer race arranged at an angle to the normal axis and also includes an annular ring flange facing inwardly to the bearing axle on the side of the bearing opposite the flange of the first bearing ring and an annular shoulder running axially in contact with the flange for securing it to the axle as well as by a sleeve arranged in contact with the annular shoulder, which sleeve has an annular rib directed outwardly which forms with the first bearing ring an annular space for a sealing agent. This arrangement provides a relatively compact assembly of relatively small width which has high load bearing capacity, good load distribution and effectively seals against leakage of lubricant and ingress of foreign particulate matter.

In order to further improve the sealing characteristics of the bearing assembly, a sealing disc or the like having sealing surface engages between confronting faces of a short inwardly directed ring flange of the first bearing ring and the inwardly directed flange of the second bearing ring. A sheet metal cap and the cover disc may be secured by spot welding or alternatively flanging to the annular outwardly directed ring flange of the first bearing ring. By this arrangement the individual parts of the bearing assembly are retained as a unit in the uninstalled condition whereby additional sealing gaps are provided with the opposing surfaces of the other bearing parts.

In those installations where the bearing cover disc faces outwardly, it is advantageous to provide an annular running groove in the radial inside area of the cover disc. In this manner liquids which may contact the cover disc and the bearing assembly from outside, especially in a stationary belt support roll, are diverted through this groove around the sealing gap in the area of the axle.

BRIEF DESCRIPTION OF THE DRAWING

These and other objects of the invention and the various features and details of the operation and construction thereof are hereinafter set forth with reference to the accompanying drawing, wherein;

FIG. 1 is a transverse sectional view through a belt support roll incorporating a bearing assembly in accordance with the present invention.

DESCRIPTION OF THE PREFERRED EMBODIMENT

Referring now to the drawing, there is illustrated a belt support roll having a generally cylindrical casing 3 rotatably supported on a journal or axle 13 by bearing assemblies 1 and 2 at opposite axial ends of the casing which are constructed in accordance with the present invention. Each ball bearing assembly comprises a first bearing ring 5 having a section 4 forming the inner raceway, a second bearing ring 7 having a section 6 forming the outer raceway and a plurality of balls 9 in the annular space between the bearing rings which are guided therein in circumferentially spaced relation by means of a cage 8 between the bearing rings.

The first bearing ring 5 is generally of S-shaped cross section and includes a radially outwardly directed annular ring flange 10 serving to fasten the bearing in the roll casing and a radially inwardly directed ring flange 17 generally parallel to the flange 10. The second bearing ring 7 has an annular ring flange 11 projecting radially inwardly from the section 6 forming the outer race. The annular flange 11 has an axially directed terminal end portion forming a shoulder 12 to support the ring on the axle 13 of the belt support roll. A cylindrical sleeve 14, preferably made of plastic material or the like circumscribes the axle 13 and forms an extension of the ring shoulder 12. The sleeve 14 has an annular radially outwardly directed rib 15 forming with the first bearing ring 5 an annular space or chamber 16 for a sealing or lubricant agent, preferably grease. Between the ring flange 17 and the inner face of the flange 11 of the second bearing ring 7, a sealing disc 18 is mounted which can be secured for example to the annular flange 11 and has axially directed relatively short flocked fibers which engage against the face of the ring flange 17 in sealing relation therewith. The inside bearing space is sealed from the space 16 provided with the sealing agent by this sealing disc 18 to prevent escape of lubricant from the bearing space. The chamber 16 is disposed axially within the cross section of the bearing assembly so that the total axial dimension or installation width may be kept very narrow. In this manner it is possible to position the ball bearing assemblies 1 and 2 very close to the end of the roll casing and in the immediate vicinity of the support point of the axle. As illustrated the inner and outer race sections 4 and 6 of the bearing are disposed at an angle to the normal axis of the axle to provide an angular contact bearing arrangement. By reason of this a large number of balls may be utilized and thereby the load carrying capacity of the bearing assemblies is increased considerably. The belt support rolls supported in this manner can also be used for conveying heavy items. Furthermore, by this arrangement the contact lines of the bearing intersect the axis of the axle outboard of the bearing assemblies at points X and Y providing high rigidity and a large support width to effectively counter moment loads when the roll is loaded heavily to one side of center.

The bearing assembly further includes a cover disc 20 confronting the ring flange 10 and a cap 19 of cup-like form which overlaps the outer peripheral edge of the flange 10 and has a return lip which seats the cover disc against the front face thereof. The inner portion of the cap 19 overlies the race of the outer bearing ring 7 and forms with its inside edge 21 a narrow sealing gap 22 with the surface of the bearing ring it confronts. By this arrangement the bearing rings, the balls and cage 8 form with the cap 19 and cover disc 20 a unitary or integral assembly which can be installed as a single unit. The cover disc 20 projects inwardly beyond the flange 15 so that the sleeve 14 also becomes an integral part of the unitary assembly. The inside edge 23 of the cover disc forms with the peripheral surface of the sleeve 14 a circumferential gap 24 for sealing the chamber 16 from the exterior. The chamber 16 is sealed from the outside by a labyrinth seal formed by the bearing ring 5, the flange 15 and the cover disc 20. Thus the assembly ensures against loss of lubricant from the chamber 16 as well as preventing penetration of dirt or foreign matter from the environment into the inside of the lubricant chamber. Furthermore any dust-like contaminations which may possibly penetrate the labyrinth seal are entrained in the lubricating or sealing agent in the lubricant chamber and cannot penetrate to the raceway surfaces. Note the flock fiber seal prevents any further movement of any outside particles to the bearing raceways.

The cover disc has an inwardly dished annular groove 25 providing an undulation in the exterior face which diverts liquid especially when the belt support is stationary which comes in contact with the cover disc around the sealing gap 24 and allows it to flow from the belt support roll.

The bearing assemblies may be supported in the roll casing and on the axle 13 in a number of well known ways. In the embodiment illustrated, a disc 26 is supported against the outer bearing ring flange 11 by means of a retaining ring 28 which engages in an annular groove 27 in the axle 13. The ring flange 10 seats in a recess 29 at each axial end of the roll casing 3. The recess 29a at one end, in the present instance, the right hand end of the roll casing extends axially inwardly further than the recess 29b at the opposite axial end. In this manner it is possible to pre-tension the bearings in the axial direction simply by fixing one bearing against a shoulder in the roll casing, in the present instance, the left hand bearing assembly and then assembling the other bearing assembly in the other end of the roll casing. The bearing assemblies may be secured by means of welding. It is, of course, to be understood that other types of fastening means may be employed. As a result of the axial pre-tensioning of the bearings, a freedom from play of the bearing is attained which ensures a wear resistant running condition.

Even though the invention has been set forth and described in connection with a particular roll support, it is to be understood that changes and modifications may be made therein within the scope of the following claims.

For example, it is possible to employ an axially acting seal ring in the gap between the flange 15 and the sleeve 14 and the cover disc 20. An annular seal or sealing agent can be likewise provided between the sheet metal cap 19 and the bearing ring 7 for sealing the inside bearing space from the inside space of the roll casing 3.

We claim:

1. A bearing assembly for a belt support roll rotatably journalled on an axle comprising inner and outer bearing rings (5, 7) having confronting spaced apart sections defining inner and outer raceways (4, 6) for a plurality of rolling elements (9) and arranged at an angle to the bearing axis, a first annular flange (10) projecting radially outwardly of said inner bearing ring (5) adapted to be mounted at its outer periphery to a roll casing, a ring flange (17) directed inwardly from said inner bearing ring raceway, a second annular flange (11) projecting radially inwardly from said outer bearing ring (7) terminating in an axially extending shoulder (12) for supporting the bearing on the axle (13), a sleeve member (14) circumscribing the axle engaging said shoulder at one axial end, an annular rib (15) projecting from said sleeve directed outwardly, spaced axially from said ring flange and forming with the inner bearing ring raceway section and ring flange, an annular chamber (16) for a sealing agent disposed axially within the cross section of the bearing assembly.

2. A bearing assembly according to claim 1 including a cap overlapping the outer bearing ring and a cover disc extending inwardly over the rib of the sleeve on the other side of the annular flange of said inner bearing ring.

3. A bearing assembly according to claim 2 including a groove running annularly in the radial inside area of the cover disc.

4. A bearing assembly as claimed in claim 2 including a cap (19) of cup-like form overlapping the outer peripheral edge of said first annular flange (10), said cap having a return lip which sets said cover disc against the front face of said first annular flange (10), the inner portion of said cap (19) overlapping the outer bearing ring (7) and having an inner edge (21) forming a narrow sealing gap (22) with the surface of the outer bearing ring (10) which it confronts.

5. A bearing assembly according to claim 1 including a sealing disc (18) with axial sealing surfaces between the face of said ring flange and the second flange of the outer bearing ring.

6. A bearing assembly as claimed in claim 1 wherein the first annular flange (10) seats against a shoulder defined by a recess (29) in an axial end of the roll casing.

* * * * *